(12) United States Patent
Maekawa et al.

(10) Patent No.: US 11,280,679 B2
(45) Date of Patent: Mar. 22, 2022

(54) TEMPERATURE MEASURING DEVICE

(71) Applicant: FANUC CORPORATION, Yamanashi (JP)

(72) Inventors: Susumu Maekawa, Yamanashi (JP); Hirohide Tsunoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 475 days.

(21) Appl. No.: 16/249,435

(22) Filed: Jan. 16, 2019

(65) Prior Publication Data
US 2019/0242756 A1    Aug. 8, 2019

(30) Foreign Application Priority Data

Feb. 8, 2018   (JP) .............................. JP2018-020981

(51) Int. Cl.
*G01K 13/00* (2021.01)
*G01K 1/02* (2021.01)
*G01K 7/42* (2006.01)

(52) U.S. Cl.
CPC ............ *G01K 1/026* (2013.01); *G01K 13/00* (2013.01); *G01K 2007/422* (2013.01)

(58) Field of Classification Search
CPC .. G01K 13/00; G01K 1/026; G01K 2007/422; G01K 3/14; G05B 23/0283; G05B 23/0267; G06Q 10/20
See application file for complete search history.

(56) References Cited

U.S. PATENT DOCUMENTS 3,683,354 A  *  8/1972  Enk ......................... G01P 13/00
                                                          408/16
4,120,196 A  *  10/1978  Hamilton ................. G01N 3/58
                                                          33/558
(Continued)

FOREIGN PATENT DOCUMENTS

JP        3-79256      4/1991
JP        10-6183      1/1998
(Continued)

OTHER PUBLICATIONS

Notification of Reasons for Refusal dated Mar. 10, 2020 in Japanese Patent Application No. 2018-020981.
(Continued)

*Primary Examiner* — Gail Kaplan Verbitsky
(74) *Attorney, Agent, or Firm* — Wenderoth, Lind & Ponack, L.L.P.

(57) ABSTRACT

To provide a temperature measuring device for a thermal displacement compensation device, in which the values output by temperature sensors are shared among a plurality of machine tools, and thus the total number of the temperature sensors is reduced, thereby suppressing the total cost and also reducing the failure risk of the temperature sensors installed in the machine tools. A plurality of machine tools are made to use, in order to monitor a temperature of each of one or more common positions set in advance, temperature information measured by a temperature sensor installed at any position in the common positions in each of the machine tools, as temperature information of any position in the common positions without a temperature sensor installed in another machine tool in the plurality of machine tools.

9 Claims, 8 Drawing Sheets

(56) References Cited

U.S. PATENT DOCUMENTS

| | | | |
|---|---|---|---|
| 10,496,072 B2* | 12/2019 | Mizoguchi | B23Q 15/18 |
| 2009/0188910 A1* | 7/2009 | McDonnell | C21D 9/30 |
| | | | 219/635 |
| 2015/0283636 A1* | 10/2015 | Yoshizaki | B23H 7/02 |
| | | | 700/162 |
| 2016/0124420 A1* | 5/2016 | Murahashi | B23Q 11/0007 |
| | | | 700/175 |
| 2017/0023417 A1* | 1/2017 | Koyama | G01K 7/427 |
| 2017/0131710 A1* | 5/2017 | Chen | G05B 19/4065 |
| 2018/0050433 A1* | 2/2018 | Hirabayashi | B23Q 11/0007 |
| 2019/0011898 A1* | 1/2019 | Saeki | G05B 19/404 |
| 2019/0235469 A1* | 8/2019 | Maekawa | G05B 19/406 |
| 2019/0235470 A1* | 8/2019 | Maekawa | G05B 19/406 |
| 2019/0235472 A1* | 8/2019 | Maekawa | G05B 19/404 |
| 2020/0057430 A1* | 2/2020 | Kettemer | G05B 19/4185 |
| 2020/0361029 A1* | 11/2020 | Goya | B23K 26/032 |
| 2021/0039217 A1* | 2/2021 | Izumi | B23Q 17/0985 |
| 2021/0055240 A1* | 2/2021 | Konishi | G06N 20/00 |

FOREIGN PATENT DOCUMENTS

| | | |
|---|---|---|
| JP | 10-092722 | 4/1998 |
| JP | 11-53012 | 2/1999 |
| JP | 11-58179 | 3/1999 |
| JP | 2003-280707 | 10/2003 |
| JP | 2004-133795 | 4/2004 |
| JP | 2008-142844 | 6/2008 |
| JP | 2008-149415 | 7/2008 |
| JP | 2009-214283 | 9/2009 |
| JP | 2012-139741 | 7/2012 |
| JP | 2013-546079 | 12/2013 |
| JP | 2015-104765 | 6/2015 |
| JP | 2016-145788 | 8/2016 |
| JP | 2016-200928 | 12/2016 |
| JP | 2017-188030 | 10/2017 |
| JP | 2017-207904 | 11/2017 |
| JP | 2019-507931 | 3/2019 |
| WO | 2017/149145 | 9/2017 |

OTHER PUBLICATIONS

Notification of Reasons for Refusal dated Nov. 5, 2019 in corresponding Japanese Patent Application No. 2018-020981.
Notification of Reasons for Refusal dated Jul. 14, 2020 in corresponding Japanese Patent Application No. 2018-020981.

* cited by examiner

FIG. 3

| MACHINE TOOL | TEMPERATURE SENSOR ID | POSITION |
|---|---|---|
| 20a | S1 | L4 |
|  | S2 | L5 |
| 20b | S3 | L1 |
|  | S4 | L2 |
|  | S5 | L4 |
| 20c | -- | -- |
| ⋮ | ⋮ | ⋮ |
| 20n | Sk-1 | L2 |
|  | Sk | L3 |

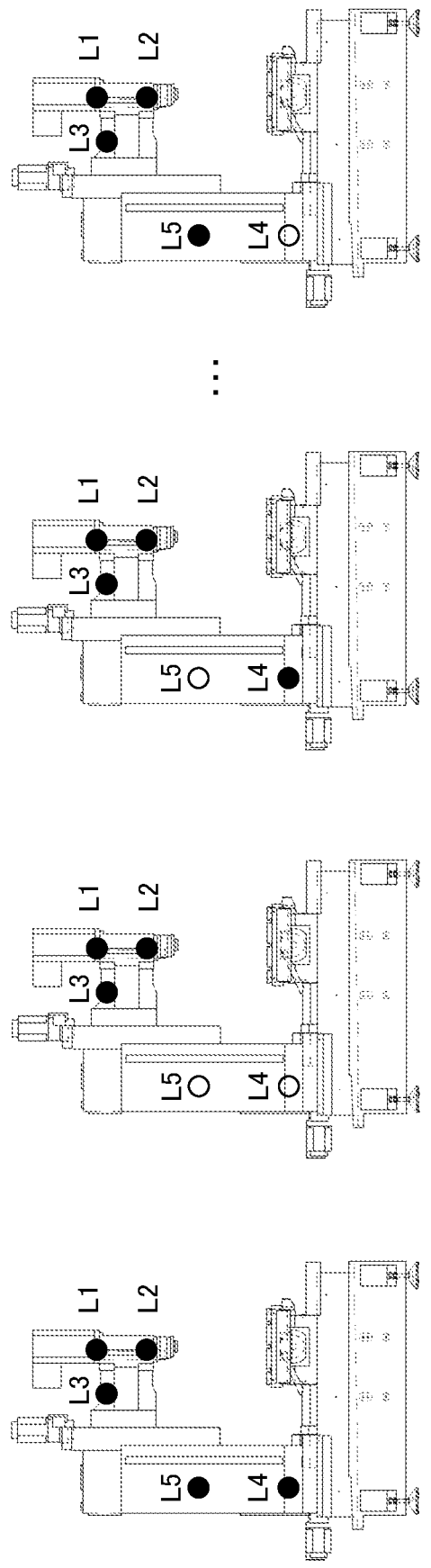

TEMPERATURE MEASURING DEVICE

This application is based on and claims the benefit of priority from Japanese Patent Application No. 2018-020981, filed on 8 Feb. 2018, the content of which is incorporated herein by reference.

BACKGROUND OF THE INVENTION

Field of the Invention

The present invention relates to a temperature measuring device.

Related Art

In a conventional technique for compensating thermal displacement caused by heat generation in a machine tool, machine conditions are monitored on the basis of the outputs from one or more temperature sensors, whereby thermal displacement is estimated and compensated.

For an example, Patent Document 1 discloses the thermal displacement compensation device in which a plurality of temperature sensors each serving as a temperature detector for structure detect the temperatures of a plurality of positions of the base and/or the column of a structure constituting a machine tool, and simultaneously with the detection, the temperature of a thermally insulated reference block from the base and/or the column is detected by another temperature sensor, whereby relative movement of a tool to a workpiece is compensated on the basis of the temperature data detected by respective temperature sensors.

Patent Document 1: Japanese Unexamined Patent Application, Publication No. H11-058179

SUMMARY OF THE INVENTION

In the thermal displacement compensation device as disclosed in Patent Document 1, even in the example case where a plurality of machine tools is regarded as equivalent models, are installed in the environments regarded as equivalent to each other, and perform the operations regarded equivalent to each other, a plurality of temperature sensors is generally installed in each of the plurality machine tools. Accordingly, as the number of the machine tools increases, the number of the temperature sensors installed in all of the machine tools increases, resulting in increase of the total cost.
With regard to this problem, for an example, if the output values of the temperature sensors are enabled to be shared among the machine tools, the number of the temperature sensors to be installed in all of the machine tools is enabled to be reduced, and the total cost is thus enabled to be suppressed. Even if a failure occurs in a temperature sensor installed in a certain machine tool A, in the case where the output value of a temperature sensor installed in another machine tool B is enabled to be shared, the failure risk of the temperature sensors installed in the machine tools are enabled to be reduced.

The object of the present invention is to provide a temperature measuring device for a thermal displacement compensation device, in which the output values of temperature sensors are shared among a plurality of machine tools, and thus the total number of the temperature sensors is reduced, resulting in suppressing the total cost and also reducing the failure risk of the temperature sensors installed in the machine tools.

(1) A temperature measuring device (for example, "a temperature measuring device 10" to be described below) according to the present invention makes, in order to monitor a temperature of each of one or more common positions set in advance, a plurality of machine tools (for example, "machine tools 20" to be described below) use temperature information measured by a temperature sensor installed at any position in the common positions in each of the machine tools, as temperature information of any position in the common positions without a temperature sensor installed in another machine tool in the plurality of machine tools.

(2) In the temperature measuring device (for example, "the temperature measuring device 10" to be described below) according to (1), the plurality of machine tools (for example, "the machine tools 20" to be described below) may be equivalent models and be installed in equivalent environments to perform equivalent types of machining, and each of the plurality of machine tools may be made to use, as the temperature information of a position without the temperature sensor installed in an own machine tool, the temperature information from the temperature sensor installed in another machine tool.

(3) In the temperature measuring device (for example, "the temperature measuring device 10" to be described below) according to (2), the temperature sensor may not be installed in a part of the plurality of machine tools (for example, "the machine tools 20" to be described below).

(4) In the temperature measuring device (for example, "the temperature measuring device 10" to be described below) according to (1), the plurality of machine tools (for example, "the machine tools 20" to be described below) may be equivalent models and be installed in equivalent environments, and the temperature sensor to be installed at a position to be hardly affected by heat generation or cooling in the machine tools may be installed only in each of a part of the plurality of machine tools, and each of the plurality of machine tools may be made to use, as the temperature information of a position without the temperature sensor installed in an own machine tool, the temperature information from the temperature sensor installed in another machine tool.

(5) A temperature measuring device (for example, "a temperature measuring device 10" to be described below) according to the present invention makes, in order to monitor a temperature of each of one or more common positions set in advance, a plurality of machine tools (for example, "machine tools 20" to be described below) use temperature information measured by a temperature sensor installed at any position in the common positions in a machine tool of the plurality of machine tools, as temperature information of any position in the common positions with an installed temperature sensor determined abnormal in another machine tool in the plurality of machine tools.

(6) The temperature measuring device (for example, "the temperature measuring device 10" to be described below) according to (1) to (5) may include a temperature information acquiring unit (for example, "a temperature information acquiring unit 131" to be described below) configured to acquire temperature information measured by a temperature sensor installed at any position in the common positions in each of the machine tools, and a temperature information providing unit (for example, "a temperature information providing unit 132" to be described below) configured to provide another machine tool in the plurality of machine tools, not equipped with a temperature sensor at any position in the common positions, with the temperature information acquired by the temperature information acquiring unit, as temperature information of the position.

(7) The temperature measuring device (for example, "the temperature measuring device 10" to be described below) according to (1) to (6) may be communicatively connected to the plurality of machine tools (for example, "the machine tools 20" to be described below).

(8) A first machine tool (for example, "a machine tool 20" to be described below) according to the present invention may include the temperature measuring device (for example, "the temperature measuring device 10" to be described below) according to (1) to (7).

(9) A second machine tool according to the present invention uses, in order to monitor a temperature of each of one or more common positions set in advance in a plurality of machine tools including the machine tool, as temperature information of any position in the common positions without a temperature sensor installed, temperature information of any position in another machine tool in the plurality of machine tools with a temperature sensor installed at the position in the common positions.

(10) A temperature measuring method according to the present invention includes, in order to monitor a temperature of each of one or more common positions set in advance, making a plurality of machine tools (for example, "machine tools 20" to be described below) use temperature information measured by a temperature sensor installed at any position in the common positions in each of the machine tools, as temperature information of any position in another machine tool in the plurality of machine tools, not equipped with a temperature sensor at the position in the common positions.

The present invention enables to provide a temperature measuring device for a thermal displacement compensation device, in which the output values of temperature sensors are shared among a plurality of machine tools, and thus the total number of the temperature sensors is reduced, resulting in suppressing the total cost and also reducing the failure risk of the temperature sensors installed in the machine tools.

BRIEF DESCRIPTION OF THE DRAWINGS

FIG. 3 is a table indicating a management table to be used in the temperature measuring device according to the first embodiment of the present invention.

FIG. 8 is a diagram illustrating the installation positions of temperature sensors in the machine tools, in the thermal displacement compensation system according to the second embodiment of the present invention.

DETAILED DESCRIPTION OF THE INVENTION

First Embodiment

The first embodiment of the present invention is described below with reference to the drawings.

Figure 1:
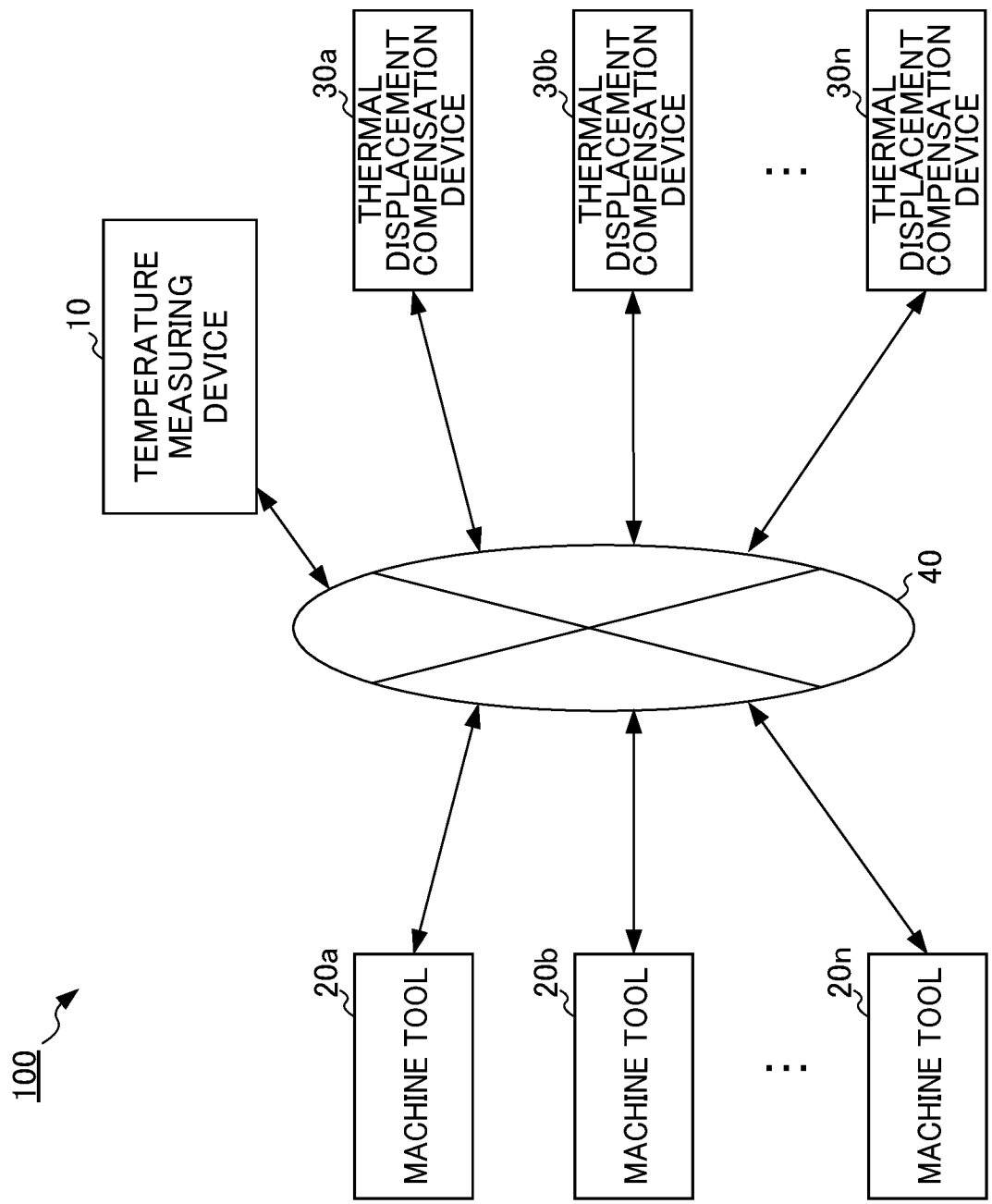
FIG. 1 is a diagram of an entire configuration of a thermal displacement compensation system including a temperature measuring device according to a first embodiment of the present invention.

FIG. 1 is a diagram of an entire configuration illustrating a thermal displacement compensation system including a temperature measuring device according to the first embodiment.

Figure 2:
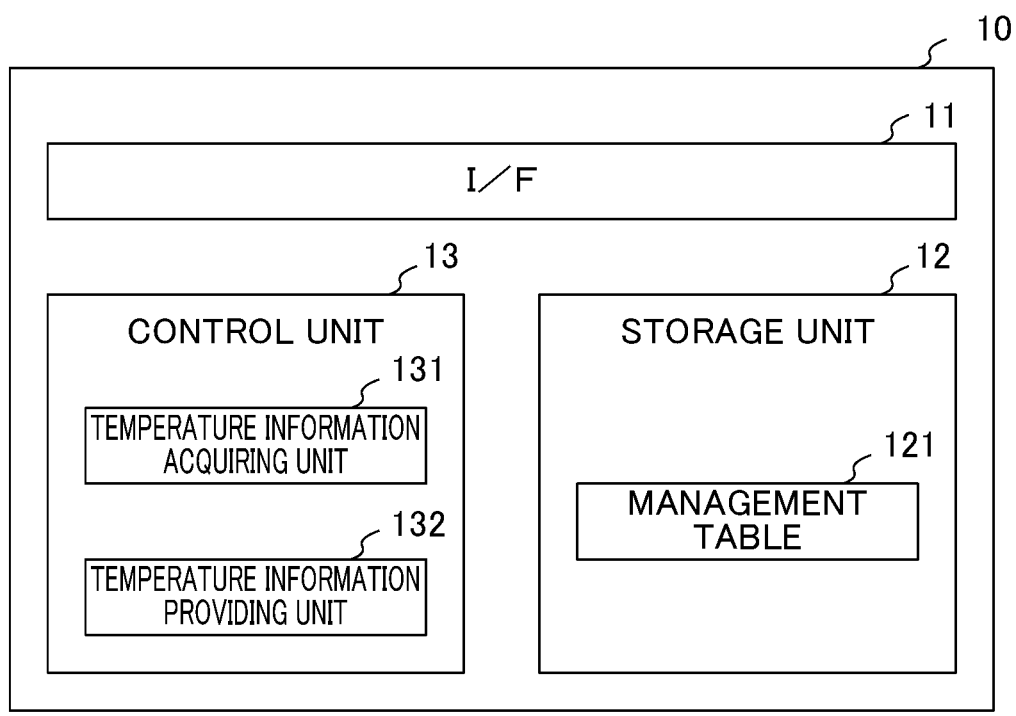
FIG. 2 is a functional block diagram of the temperature measuring device according to the first embodiment of the present invention.

FIG. 2 is a functional block diagram illustrating the temperature measuring device in detail according to the first embodiment.

FIG. 3 is a table indicating an example of a management table to be used in the temperature measuring device according to the first embodiment.

Figure 4:
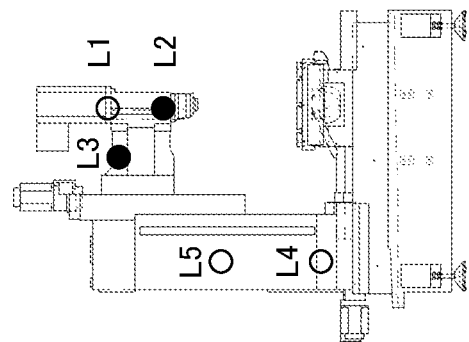
FIG. 4 is a diagram illustrating the installation positions of temperature sensors in machine tools in the thermal displacement compensation system according to the first embodiment of the present invention.
Figure 4:
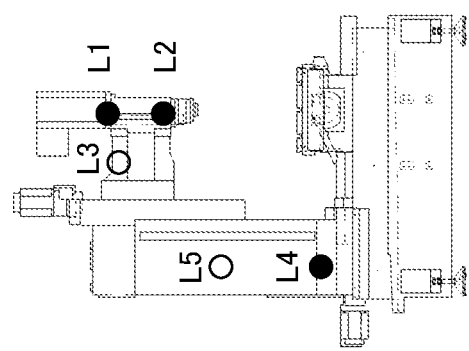
Figure 4:
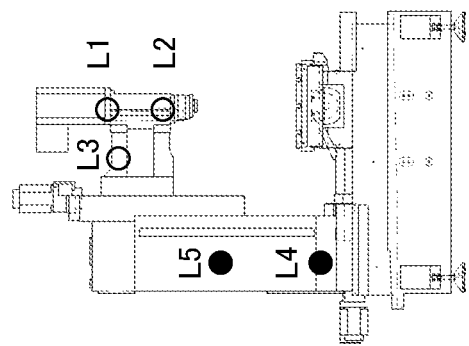

FIG. 4 is a diagram illustrating examples of the installation positions of temperature sensors in machine tools, in the thermal displacement compensation system according to the first embodiment.

Figure 5:
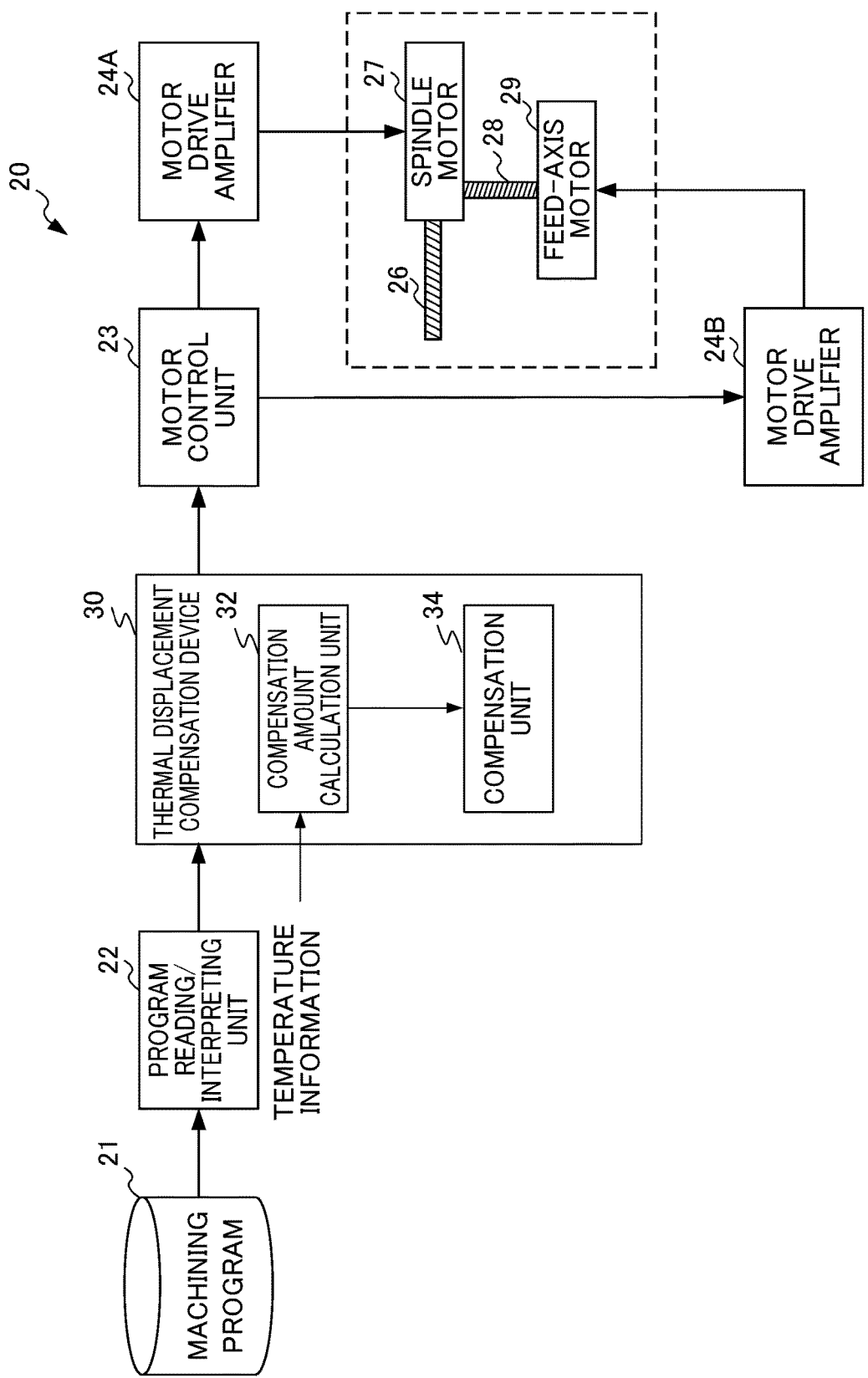
FIG. 5 is a functional block diagram of the machine tool and a thermal displacement compensation device according to the first embodiment of the present invention.

FIG. 5 is a functional block diagram illustrating the machine tool and a thermal displacement compensation device in detail according to the first embodiment.

[Configuration of Thermal Displacement Compensation System 100]

The description below with reference to FIG. 1 is about the configuration of a thermal displacement compensation system 100 including a temperature measuring device according to the present embodiment.

The thermal displacement compensation system 100 includes a temperature measuring device 10, a machine tool 20, a thermal displacement compensation device 30, and a network 40.

Plural units of the machine tools 20 are included in the system, and the respective unit numbers of the temperature measuring devices 10 and the thermal displacement compensation devices 30 may be one or plural number.

The temperature measuring device(s) 10, the machine tools 20 and the thermal displacement compensation device(s) 30 are respectively connected to the network 40, and are capable of mutually communicating via the network 40.

The network 40 is, for example, a LAN (Local Area Network) built in a factory, the Internet, a public telephone network, or a combination thereof.

The network 40 is not particularly limited, with respect to a specific communication system, wired communication or wireless connection, or the like.

It is noted that the temperature measuring device(s) 10 and each of the machine tools 20 may be directly connected to each other via a connecting portion, not through communication via the network 40.

Each of the machine tools 20 and the thermal displacement compensation device(s) 30 may be directly connected to each other via a connecting portion, not through communication via the network 40.

The temperature measuring device(s) 10 and the thermal displacement compensation device(s) 30 may be directly connected to each other via a connecting portion, not through communication via the network 40.

It is noted that although, in FIG. 1, n units of machine tools 20 and n units of thermal displacement compensation devices 30 are made in one-to-one pairs so as to mutually communicate, the present invention is not limited thereto. Alternatively, the unit number of the machine tools 20 and the unit number of the thermal displacement compensation devices 30 may be different from each other.

[Configuration of Temperature Measuring Device 10]

The next description with reference to FIG. 2 is about the functions of the temperature measuring device 10.

FIG. 2 is the functional block diagram illustrating the functional blocks included in the temperature measuring device 10.

The temperature measuring device 10 includes a communication interface 11, a storage unit 12 and a control unit 13.

As will be described below, the communication interface 11 is used by a temperature information acquiring unit 131 at the time of acquiring temperature information from the temperature sensors installed in the machine tools 20, and is used by a temperature information providing unit 132 at the time of providing the machine tools 20 with the temperature information acquired by the temperature information acquiring unit 131.

The storage unit 12 stores a management table 121 indicating respective positions of respective temperature sensors installed in respective machine tools.

FIG. 3 shows one example of the management table 121.

It is noted that although the example indicates the case where the unit number n of the machine tools is four or more, the same applies to the case where the unit number n is two or three.

The management table shown in FIG. 3 indicates that, in a machine tool 20a, a temperature sensor having a temperature sensor ID "S1" (hereinafter, a temperature sensor having a temperature sensor ID "Sk" may be referred to as a temperature sensor "Sk") is installed at a position "L4," and a temperature sensor "S2" is installed at a position "L5."

The management table further indicates that, in a machine tool 20b, a temperature sensor "S3" is installed at a position "L1," a temperature sensor "S4" is installed at a position "L2," and a temperature sensor "S5" is installed at the position "L4."

The management table further indicates that no temperature sensor is installed in a machine tool 20c.

The management table further indicates that, in a machine tool 20n, a temperature sensor "Sk-1" is installed at the position "L2," and a temperature sensor "Sk" is installed at a position "L3."

FIG. 4 shows the examples of the position "L1" to the position "L5" described above.

The position "L1" is located in the vicinity of a spindle motor.

The position "L2" is located in the vicinity of the rotary axis of the spindle motor.

The position "L3" is located inside the support portion of the spindle motor.

The position "L4" is located in the vicinity of the base of the support portion of a Z-axis motor.

The position "L5" is located inside the support portion of the Z-axis motor.

These installation positions are common in the machine tool 20a to the machine tool 20n.

The black circles in FIG. 4 indicate the positions each at which the temperature sensor is installed, while the white circles indicate the positions each at which such a temperature sensor is not installed.

As shown in FIG. 4, in the machine tool 20a, the temperature sensors are respectively installed at the position "L4" and the position "L5," while no temperature sensor is installed at the position "L1" to the position "L3."

In the machine tool 20b, the temperature sensors are respectively installed at the position "L1," the position "L2" and the position "L4," while no temperature sensor is installed at the position "L3" or the position "L5."

In the machine tool 20c, no temperature sensor is installed. The illustrations of a machine tool 20d to a machine tool 20n-1 are omitted.

In the machine tool 20n, the temperature sensors are respectively installed at the position "L2" and the position "L3," while no temperature sensor is installed at the position "L1," the position "L4," or the position "L5."

It is assumed that the machine tool 20a to the machine tool 20n in FIG. 4 are equivalent models, and are installed in equivalent environments to perform equivalent types of machining.

Accordingly, the values output by the temperature sensors assumed to be installed in the same position in the machine tool 20a to the machine tool 20n are substantially equal.

It is noted that the models described above refer to, for example, model numbers, versions, options, etc. of the machine tool 20a to the machine tool 20n.

Thus, whether or not the models are equivalent is determined on the basis of a predetermined criterion set in advance. For an example, the equivalent models may refer to the tools of the same model including some different options and some different versions.

It is noted that this is only an example, and the present invention is not limited thereto.

A user may arbitrarily set such a predetermined criterion in advance.

Whether or not the environments are equivalent is also determined on the basis of a predetermined criterion set in advance.

More specifically, for an example, the plurality of machine tools 20a to 20n perform work on the same manufacturing line. Even in the case where the plurality of machine tools 20a to 20n perform work on different manufacturing lines, if the machine tools are located in the same factory and maintained at the same temperature by air conditioning, it may be determined that the plurality of machine tools 20a to 20n are located in equivalent environments.

These are only examples, and the present invention is not limited thereto.

A user may arbitrarily set such a predetermined criterion in advance.

Whether or not the types of machining are equivalent is also determined on the basis of a predetermined criterion set in advance.

That is, each of the plurality of machine tools 20a to 20n stores a machining program for performing machining operation. For an example, as for the equivalent types of machining, the machine tools may include equivalent machining programs, and may thus be capable of simultaneously performing the equivalent types of machining with the equivalent machining programs.

It is noted that the case of equivalent machining programs herein may include not only the case of the same machining program, but also the case of the different versions of the program or the like providing substantially the same machining. These are only examples, and the present invention is not limited thereto.

A user may arbitrarily set such a predetermined criterion in advance.

As described above, the plurality of the machine tools 20a to 20n in the first embodiment are equivalent models, are installed at the positions which are regarded as equivalent installation environments, and perform equivalent types of machining.

The control unit 13 is a device known to those skilled in the art, which has CPU, ROM, RAM, CMOS memory and the like and is configured to communicate to each other via a bus.

The CPU is a processor for controlling the temperature measuring device 10 as a whole.

The CPU is configured to read out the system program and the application program stored in the ROM via the bus to control the temperature measuring device 10 as a whole on the basis of the system program and the application program, whereby the control unit 13 realizes, as shown in FIG. 2, the functions of the temperature information acquiring unit 131 and the temperature information providing unit 132.

The RAM stores various types of data such as temporary calculation data and display data.

The CMOS memory is configured as a nonvolatile memory in which backup is performed by a battery not shown, and in which the storage state thereof is maintained even when the power of the temperature measuring device 10 is turned off.

The temperature information acquiring unit 131 acquires temperature information for each of the machine tools 20, measured by a temperature sensor installed at any position in the positions ("L1" to "L5" in FIG. 4) common in the machine tools 20 exemplified in FIG. 4.

The temperature information providing unit 132 provides, on the basis of the management table 121, the temperature information measured by a temperature sensor installed at any position in the positions common in the plurality of machine tools 20, and then acquired by the temperature information acquiring unit 131, for another machine tool 20 not equipped with a temperature sensor at the concerned position in the positions common in the machine tools 20, as the temperature information of the concerned position.

In the case based on the management table 121 indicated in FIG. 3 as an example, the temperature information providing unit 132 provides the temperature information measured by the temperature sensor "S1" installed at the position "L4" in the machine tool 20a, for a machine tool 20 not equipped with a temperature sensor at the position "L4," as the temperature information of the position "L4" in the machine tool 20.

The temperature information providing unit 132 further provides the temperature information measured by the temperature sensor "S2" installed at the position "L5" in the machine tool 20a, for a machine tool 20 not equipped with a temperature sensor at the position "L5," as the temperature information of the position "L5" in the machine tool 20.

The temperature information providing unit 132 further provides the temperature information measured by the temperature sensor "S3" installed at the position "L1" in the machine tool 20b, for a machine tool 20 not equipped with a temperature sensor at the position "L1," as the temperature information of the position "L1" in the machine tool 20.

The temperature information providing unit 132 further provides the temperature information measured by the temperature sensor "S4" installed at the position "L2" in the machine tool 20b, for a machine tool 20 not equipped with a temperature sensor at the position "L2," as the temperature information of the position "L2" in the machine tool 20.

The temperature information providing unit 132 further provides the temperature information measured by the temperature sensor "S5" installed at the position "L4" in the machine tool 20b, for a machine tool 20 not equipped with a temperature sensor at the position "L4," as the temperature information of the position "L4" in the machine tool 20.

Since the machine tool 20c is not equipped with any temperature sensor, the temperature information acquiring unit 131 acquires none of the temperature information from the machine tool 20c.

On the other hand, the temperature information providing unit 132 provides the temperature information measured by the temperature sensors respectively installed at the position "L1" to the position "L5" in the machine tools 20 excluding the machine tool 20c, for the machine tool 20c, as the temperature information of the position "L1" to the position "L5" in the machine tool 20c.

The descriptions of the machine tool 20d to the machine tool 20n-1 are omitted.

The temperature information providing unit 132 provides the temperature information measured by the temperature sensor "Sk-1" installed at the position "L2" in the machine tool 20n, for a machine tool 20 not equipped with a temperature sensor at the position "L2," as the temperature information of the position "L2" in the machine tool 20.

The temperature information providing unit 132 further provides the temperature information measured by the temperature sensor "Sk" installed at the position "L3" in the machine tool 20n, for a machine tool 20 not equipped with a temperature sensor at the position "L3," as the temperature information of the position "L3" in the machine tool 20.

It is noted that, in the example case where there are a plurality of temperature sensors respectively installed at the same position in the plurality of machine tools 20 such as the position "L2" and the position "L4" in FIG. 4, the average of the plurality pieces of temperature information measured by these temperature sensors may be used, or the maximum value in the plurality pieces of temperature information measured by these temperature sensors may be used, as the temperature information of the position.

Even if a failure occurs in any of the temperature sensors, since the plurality of temperature sensors are installed at the same position in the plurality of machine tools 20, another temperature sensor is enabled to be substituted for the temperature sensor, resulting in enabling to reduce the failure risk of the temperature sensors.

In order to monitor a temperature of each of the one or more common positions set in advance, the temperature measuring device 10 having the above-described configuration makes the plurality of machine tools 20 use the temperature information measured by a temperature sensor installed at any position in the common positions in each of the machine tools 20, as the temperature information of any position in the common positions in another machine tool 20 not equipped with a temperature sensor at the position.

More specifically, the temperature measuring device 10 makes each of the machine tools 20 use the temperature information from the temperature sensors installed in other machine tools, as the temperature information of the position without any temperature sensor installed in the own machine tool.

It is noted that the number of the machine tools 20 is not particularly limited as long as the number is a plural number. The temperature information may be shared among an arbitrary plural number of the machine tools 20.

In other words, the temperature measuring device 10 makes an arbitrary plural number of the machine tools 20 use the temperature information measured by a temperature sensor installed at any position in the common positions in the machine tools, as the temperature information of the concerned position in a machine tool 20 not equipped with a temperature sensor at any position in the common positions. In the configuration where the thermal displacement compensation system 100 includes two units of the machine tool 20a and the machine tool 20b, the number of the machine tools 20 is the minimum.

A machine tool 200, like the machine tool 20c indicated in the management table 121 shown in FIG. 3, may not be equipped with any temperature sensor.

[Configurations of Machine Tool 20 and Thermal Displacement Compensation Device 30]

The next description with reference to FIG. 5 is about the structural example of the machine tool 20 and the thermal displacement compensation device 30 included in the thermal displacement compensation system 100.

FIG. 5 shows an example of the functional block diagram illustrating the functional blocks included in the machine tool 20 and the thermal displacement compensation device 30.

As shown in FIG. 5, the machine tool 20 carries out machining by a spindle 26 which has an attached cutting tool and is rotated by a spindle motor 27, and by a feed axis 28 which feeds out the spindle 26.

That is, the cutting tool is rotated by the spindle motor 27 for driving the spindle 26, and is fed out by a feed-axis motor 29 for driving the feed axis 28.

It is noted that although the machine tool 20 is a cutting machine in the description of the present embodiment, the present invention is not limited thereto.

The machine tool 20 stores a plurality of machining programs 21 based on the machining contents to a workpiece. The machine tool 20 includes a program reading/interpreting unit 22 for reading out and interpreting the machining programs 21 to thereby extract cutting conditions (for example, frequency of acceleration/deceleration of the spindle, rotation number, cutting load, and cutting time) and output position command data and the like to the thermal displacement compensation device 30, a motor control unit 23 for creating operation commands to drive the spindle motor 27 and the feed-axis motor 29 of the machine tool 20 on the basis of the position command data output by the thermal displacement compensation device 30 after thermal displacement compensation, a motor drive amplifier 24A for amplifying the operation command to output the operation command to the spindle motor 27 of the machine tool 20, and a motor drive amplifier 24B for outputting the operation command to the feed-axis motor 29. The machine tool 20 may output the information on a rotation number, a cutting time and the like obtained in real time from the spindle motor 27 and/or the feed-axis motor 29, to the thermal displacement compensation device 30.

In the machine tool 20, the temperature sensor for acquiring temperature information is installed at any position in the positions which are common in the plurality of machine tools 20 and are one or more positions set in advance, in order to monitor a temperature of each of the common positions.

The machine tool 20 further includes other units not shown, which are a temperature measuring unit for measuring the temperature by using the temperature sensor installed in the own machine tool 20, and a temperature information requesting unit for requesting the temperature information of the position without any temperature sensor in the own machine tool 20, to the temperature measuring device 10.

As shown in FIG. 5, the thermal displacement compensation device 30 includes a compensation amount calculation unit 32 serving as compensation amount calculation means and a compensation unit 34 serving as compensation execution means. The compensation amount calculation unit 32 calculates a compensation amount corresponding to a thermal displacement amount of a mechanical component, by using the temperature information provided by the machine tool 20.

The compensation unit 34 compensates the mechanical position of the mechanical component on the basis of the compensation amount of the mechanical component calculated by the compensation amount calculation unit 32.

Alternatively, the compensation unit 34 transmits the compensation amount of the mechanical component to the machine tool 20.

More specifically, as shown in FIG. 5, the compensation unit 34 compensates the cutting conditions output by the program reading/interpreting unit 22 of the machine tool 20, by using the compensation amount of the mechanical component, and thereafter outputs the position command data to the motor control unit 23.

[Effects Produced by First Embodiment]

The temperature measuring device 10 according to the first embodiment makes the plurality of machine tools 20 use the temperature information measured by a temperature sensor installed at any position in the positions common in the plurality of machine tools 20, as the temperature information of the concerned position in another machine tool 20 at which a temperature sensor is not installed in the common positions.

In the first embodiment, the plurality of machine tools 20 are all equivalent models, and are installed in equivalent environments to perform equivalent types of machining. The temperature measuring device 10 makes each of the machine tools 20 use the temperature information from the temperature sensor installed in another machine tool 20, as the temperature information of the position in the own machine tool 20 at which a temperature sensor is not installed.

This reduces the total number of the temperature sensors by sharing a value output by a temperature sensor among the plurality of machine tools, thereby enabling to reduce the total cost and further to reduce the failure risk of the temperature sensors installed in the machine tools.

Second Embodiment

The second embodiment of the present invention is described below with reference to the drawings.

Figure 6:
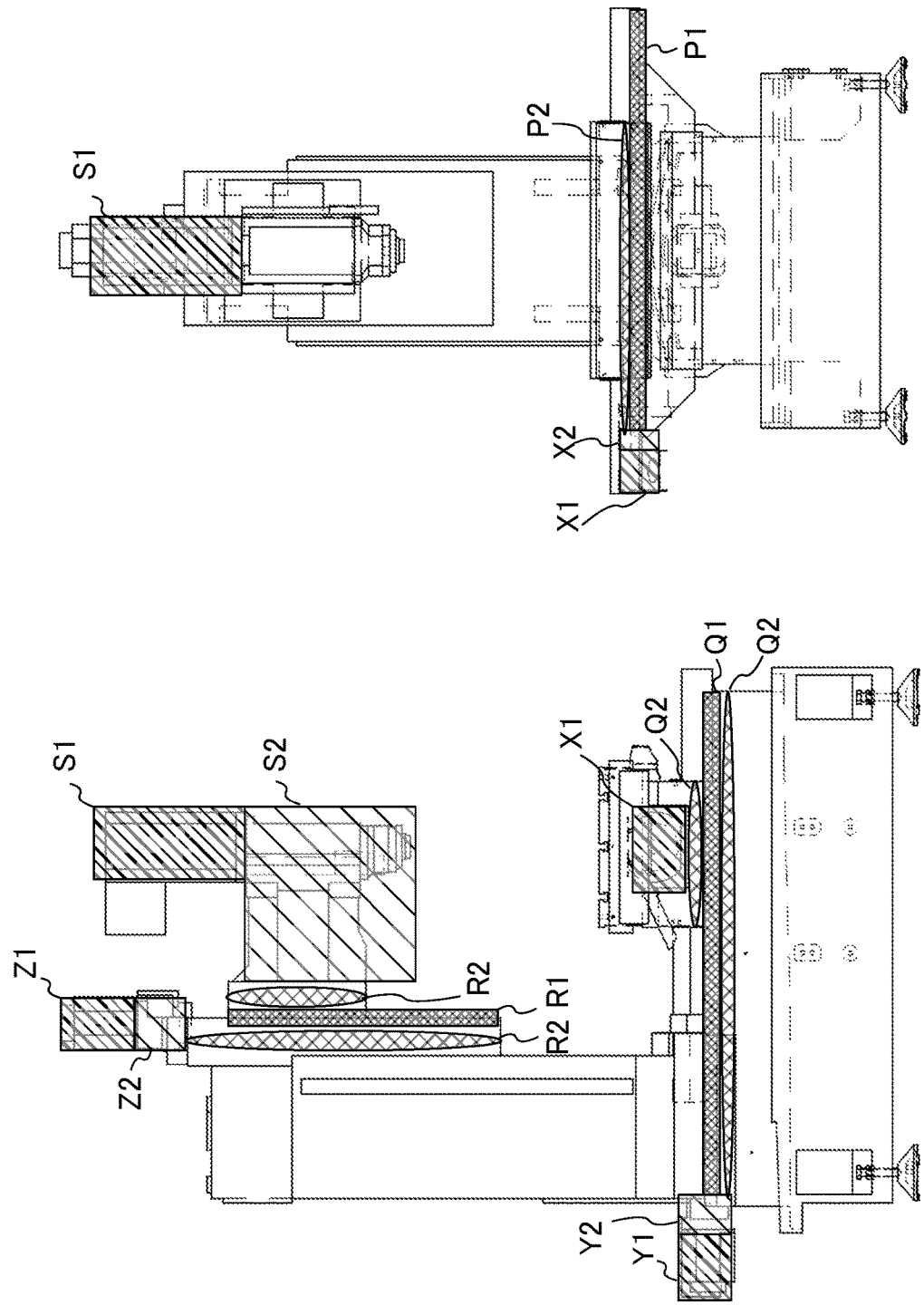
FIG. 6 is a diagram illustrating the portions to be affected by heat generation in a machine tool, in a thermal displacement compensation system according to a second embodiment of the present invention.

FIG. 6 is a diagram illustrating the portions to be affected by heat generation in a machine tool, in a thermal displacement compensation system according to the second embodiment.

Figure 7:
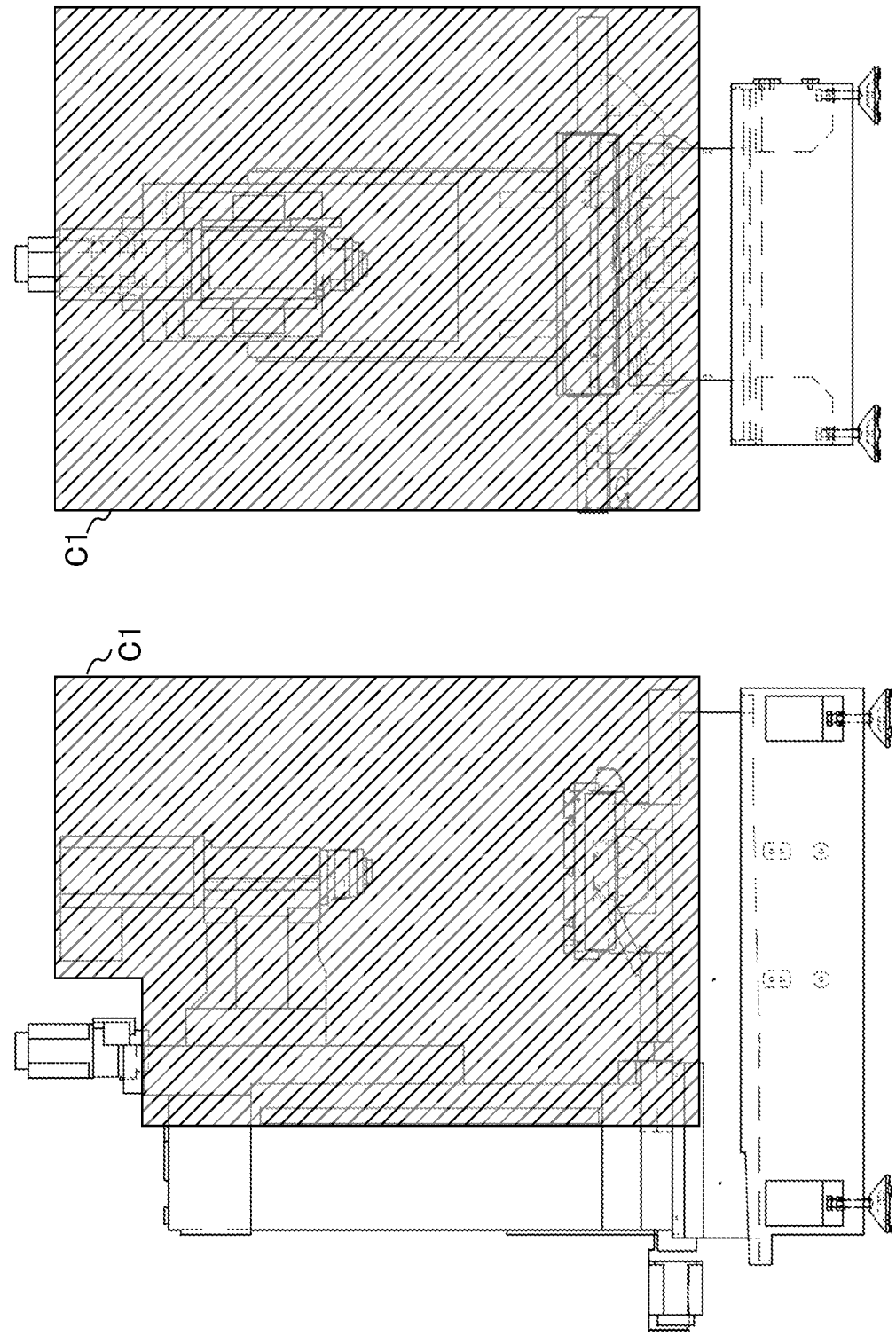
FIG. 7 is a diagram illustrating the portions to be affected by cutting fluid in the machine tool, in the thermal displacement compensation system according to the second embodiment of the present invention.

FIG. 7 is a diagram illustrating the portions to be affected by cutting fluid in the machine tool, in the thermal displacement compensation system according to the second embodiment.

FIG. 8 is a diagram illustrating examples of the installation positions of the temperature sensors in the machine tools, in the thermal displacement compensation system according to the second embodiment.

In the second embodiment, the configurations themselves of the temperature measuring device 10, the machine tools 20, the thermal displacement compensation devices 30, and the thermal displacement compensation system 100 including the above components are basically the same as those of the first embodiment, and the illustrations and the descriptions are thus omitted.

In the second embodiment, although the plurality of machine tools 20 are equivalent models, and are installed in equivalent environments, the machine tools 20 are not required to perform equivalent types of machining.

In the plurality of machine tools 20, a temperature sensor to be installed at a position to be hardly affected by heat generation or cooling is installed only in some of the plurality of machine tools 20.

In the second embodiment, the positions of the temperature sensors are divided into the two types, which are the positions respectively to be affected by the heat generation and cooling caused by the operation of the machine tools 20, and the positions to be hardly affected by the heat generation or cooling caused by the operation of the machine tools 20. The plurality of machine tools 20 share only the temperature information from the temperature sensors installed at the positions to be hardly affected by heat generation or cooling.

Examples of the positions respectively to be affected by the heat generation and cooling caused by the operation of the machine tools 20 include the positions to be affected by the heat generated by motors, the positions to be affected by the heat generated by sliding, and the positions to be affected by cutting fluid.

The positions to be affected by the heat generated by motors are the positions located in the vicinities of the spindle motor and respective axes motors, and are thus to be affected by the heat generated by the operation of respective motors.

The positions to be affected by the heat generated by sliding are the positions respectively to be affected by the heat generated when a ball screw and/or a linear guide slides by the movement of the respective feed axes.

The positions to be affected by cutting fluid are the positions to which the cutting fluid is applied directly, or the splashed cutting fluid is applied, or the space which is filled with the mist of the cutting fluid, and are thus to be affected by cooling by the cutting fluid.

On the other hand, the positions to be hardly affected by heat generation or cooling correspond to the positions respectively apart from the motors and the sliding portions and thus hardly affected by the heat generated by such heat sources, and outside the space in contact with the cutting fluid.

Examples of the temperature sensors installed at the positions to be hardly affected by heat generation or cooling may include a temperature sensor for measuring outside air.

FIG. 6 shows the positions to be affected by heat generation in the machine tool 20.

The hatched portions in FIG. 6 are the positions to be affected by heat generation.

A hatched portion "S1" corresponds to the position of the spindle motor which is a heat source.

A hatched portion "S2" corresponds to the position which is adjacent to "S1" and thus to be affected by the heat conducted from the spindle motor which is a heat source.

A hatched portion "X1" corresponds to the position of an X-axis motor which is a heat source.

A hatched portion "X2" corresponds to the position which is adjacent to "X1" and thus to be affected by the heat conducted from the X-axis motor which is a heat source.

A hatched portion "P1" corresponds to the position where a ball screw and/or a linear guide slides by the operation of the feed axis driven by the X-axis motor.

A hatched portion "P2" corresponds to the position which is adjacent to "P1" and thus to be affected by the heat conducted from the ball screw and/or the linear guide.

A hatched portion "Y1" corresponds to the position of a Y-axis motor which is a heat source.

A hatched portion "Y2" corresponds to the position which is adjacent to "Y1" and thus to be affected by the heat conducted from the Y-axis motor which is a heat source.

A hatched portion "Q1" corresponds to the position where a ball screw and/or a linear guide slides by the operation of the feed axis driven by the Y-axis motor.

A hatched portion "Q2" corresponds to the position which is adjacent to "Q1" and thus to be affected by the heat conducted from the ball screw and/or the linear guide.

A hatched portion "Z1" corresponds to the position of a Z-axis motor which is a heat source.

A hatched portion "Z2" corresponds to the position which is adjacent to "Z1" and thus to be affected by the heat conducted from the Z-axis motor which is a heat source.

A hatched portion "R1" corresponds to the position where a ball screw and/or a linear guide slides by the operation of the feed axis driven by the Y-axis motor.

A hatched portion "R2" corresponds to the position which is adjacent to "R1" and thus to be affected by the heat conducted from the ball screw and/or the linear guide.

FIG. 7 shows the positions to be affected by cooling by the cutting fluid in the machine tool 20.

A hatched portion "C1" in FIG. 7 corresponds to the position to be affected by cooling by the cutting fluid.

More specifically, the hatched portion "C1" in FIG. 7 corresponds to the machining space covered by a cover or the like, to which the cutting fluid is applied directly, or the splashed cutting fluid is applied, or which is filled with the mist of the cutting fluid.

In each of the examples shown in FIG. 6 and FIG. 7, the positions of the temperature sensors are divided into two types, which are the positions in the hatched areas respectively to be affected by heat generation and cooling, and the positions in the un-hatched areas to be hardly affected by heat generation or cooling. The plurality of machine tools 20 share only the temperature information of the temperature sensors installed at the positions which are in the un-hatched areas in the machine tools 20.

FIG. 8 shows examples of the installation positions of the temperature sensors of the case where the positions respectively to be affected by heat generation and cooling correspond to the positions shown in FIG. 6 and FIG. 7.

As for the position "L1" to the position "L3" respectively to be affected by heat generation and cooling, the temperature sensors are installed in all of the machine tool 20a to the machine tool 20n.

On the other hand, as for the position "L4" and the position "L5" to be hardly affected by heat generation or cooling, the temperature sensors are installed in some machine tools 20 in the machine tool 20a to the machine tool 20n, and the temperature information thereof is thus shared among the machine tool 20a to the machine tool 20n.

[Effects Produced by Second Embodiment]

In the second embodiment, the plurality of machine tools 20 are equivalent models and are installed in equivalent environments. The temperature sensors to be installed at the positions to be hardly affected by heat generation or cooling in the machine tools 20 are installed only in some of the plurality of machine tools 20.

This reduces the total number of the temperature sensors by sharing a value output by a temperature sensor among the plurality of machine tools 20 as in the first embodiment, even in the case where the plurality of machine tools 20 do not operate substantially equivalently, thereby enabling to reduce the total cost and to reduce the failure risk of the temperature sensors installed in the machine tools.

Modification 1

Although the temperature measuring device 10 and the machine tool 20 are configured as individual components in each of the descriptions of the first embodiment and the second embodiment, the present invention is not limited thereto.

For an example, the machine tool 20 may be configured to include the temperature measuring device 10.

In this case, in the plurality of machine tools 20, the machine tool 20 including the temperature measuring device 10 may serve as a master, and each of the other machine tools 20 may serve as a slave.

Modification 2

Although, in each of the descriptions of the first embodiment and the second embodiment, the temperature measuring device serving as a device separated from the machine tools is configured to provide the temperature information measured by a temperature sensor installed at a certain machine tool for the other machine tools, the present invention is not limited thereto.

In an example configuration, a machine tool A may sample the temperature information at a sampling time set in advance by using a temperature sensor installed at a certain position in the own machine tool A, and further provide the temperature information for a shared storage device, while a machine tool B may receive from the storage device the temperature information of the position without a temperature sensor installed in the own machine tool B, to use the temperature information of the position.

Modification 3

Although, in each of the descriptions of the first embodiment and the second embodiment, the temperature measuring device serving as a device separated from the machine tools is configured to mediate the temperature information among the plurality of machine tools, the present invention is not limited thereto.

In an example configuration, a machine tool A having a temperature measuring unit and a temperature information requesting unit may sample temperature information at a sampling time set in advance by using a temperature sensor installed at a certain position in the own machine tool A, and further provide the temperature information for another machine tool B, and also receive the temperature information at the position without a temperature sensor installed in the own machine tool B, from another machine tool C equipped with a temperature sensor installed at the position. Furthermore, each of the machine tools may be configured to transmit the temperature information measured by a temperature sensor installed in the own machine tool to another machine tool, by peer-to-peer communication, as an example.

Modification 4

In each of the descriptions of the first embodiment and the second embodiment, the temperature measuring device includes the temperature information acquiring unit and the temperature information providing unit, the temperature information acquiring unit acquires the temperature information measured by the temperature sensors installed in the machine tool A, and the temperature information providing unit provides the temperature information for the machine tool B not equipped with a temperature sensor at the installation position. However, the present invention is not limited thereto.

In an example configuration, a temperature sensor itself installed at a certain position in the machine tool A may provide the temperature information measured by the temperature sensor for the machine tool B by peer-to-peer communication as an example, while the machine tool B may use the temperature information as the temperature information of the position.

Modification 5

Although, in each of the descriptions of the first embodiment and the second embodiment, the temperature measuring device 10 makes another machine tool not equipped with a temperature sensor at any position in the common positions in the respective machine tools 20 use the temperature information measured by the temperature sensor installed at the position, as the temperature information of the concerned position, the present invention is not limited thereto. For an example, in order to monitor a temperatures of each of the one or more common positions set in advance in the plurality of machine tools 20, the temperature measuring device 10 may make a machine tool 20 in the plurality of machine tools 20 use the temperature information measured by a temperature sensor installed at any position in the common positions, as temperature information of any position in the common positions with a temperature sensor determined abnormal in another machine tool 20 in the plurality of machine tools 20.

For an example, in the case where the plurality of machine tools 20 are equivalent models and are installed in equivalent environments to perform equivalent types of machining, and a temperature sensor installed in a machine tool 20 in the plurality of machine tools 20 is determined abnormal, the temperature measuring device 10 may make the machine tool 20 use the temperature information transmitted by a temperature sensor installed at the same position in another machine tool 20 in the plurality of machine tools, as the temperature information of the position with the installed temperature sensor determined abnormal.

In another example, in the case where the plurality of machine tools 20 are equivalent models and are installed in equivalent environments, and a temperature sensor installed at a position to be hardly affected by heat generation or cooling in a machine tool 20 in the plurality of machine tools 20 is determined abnormal, the temperature measuring device 10 may make the machine tool 20 use the temperature information transmitted by a temperature sensor installed at the same position in another machine tool 20 in the plurality of machine tools, as the temperature information of the position with the installed temperature sensor determined abnormal.

With reference to FIG. 8, in the case where an abnormality occurs in the temperature sensor installed at the position L5 in the machine tool 20*a*, since the position L5 is to be hardly affected by heat generation or cooling in the machine tool, the temperature information in the machine tool 20*a* may be interpolated with the temperature information measured by the temperature sensor installed at the position L5 in another machine tool 20 (for example, the temperature sensor installed at the position L5 in the machine tool 20*n*) which is an equivalent model and installed in an equivalent environment. In another case where an abnormality occurs in the temperature sensor installed at the position L1 in the machine tool 20*a*, since the position L1 is to be affected by heat generation and cooling in the machine tool, the temperature information in the machine tool 20*a* may be interpolated with the temperature information measured by a temperature sensor installed at the position L1 in another machine tool 20 (for example, the temperature sensor installed at the position L1 in the machine tool 20b) which is an equivalent model, and is installed in an equivalent environment to perform an equivalent type of machining.

Although the embodiments of the present invention have been described so far, the present invention is not limited to the above-described embodiments.

The effects described in the above-described embodiments are listed merely as the most preferable effects produced by the present invention. The effects produced by the present invention are not limited to those described in the above embodiments.

The control method executed by the temperature measuring device 10 is realized by software.

In the case where the control method is realized by software, the programs included in the software are installed in a computer (the temperature measuring device 10).

These programs may be distributed to a user by being stored in a removable medium, or may be distributed by being downloaded via a network to user's computer.

Alternatively, these programs may be provided for user's computer (the temperature measuring device 10) as a Web service via a network without being downloaded.

EXPLANATION OF REFERENCE NUMERALS

10 TEMPERATURE MEASURING DEVICE
11 COMMUNICATION INTERFACE
12 STORAGE UNIT
13 CONTROL UNIT
20 MACHINE TOOL
21 MACHINING PROGRAM
22 PROGRAM READING/INTERPRETING UNIT
23 MOTOR CONTROL UNIT
24A, 24B MOTOR DRIVE AMPLIFIER
26 SPINDLE
27 SPINDLE MOTOR
28 FEED AXIS
29 FEED-AXIS MOTOR
30 THERMAL DISPLACEMENT COMPENSATION DEVICE
32 COMPENSATION AMOUNT CALCULATION UNIT
34 COMPENSATION UNIT
40 NETWORK
100 THERMAL DISPLACEMENT COMPENSATION SYSTEM
121 MANAGEMENT TABLE
131 TEMPERATURE INFORMATION ACQUIRING UNIT
132 TEMPERATURE INFORMATION PROVIDING UNIT

What is claimed is:

1. A temperature measuring device configured to acquire, in order to monitor a temperature of each of one or more common positions shared between a plurality of machine tools and set in advance, temperature information measured by a temperature sensor installed at a position of the common positions in at least one of the machine tools, and to provide the temperature information acquired as temperature information for that position in another machine tool of the plurality of machine tools that does not have a temperature sensor installed at that position.

2. The temperature measuring device according to claim 1, wherein the plurality of machine tools are equivalent models and are installed in equivalent environments to perform equivalent types of machining, and
each of the plurality of machine tools that does not have a temperature sensor installed at any of the common positions is configured to receive the temperature information of a corresponding position from another of the plurality of machine tools that does have a temperature sensor installed at a corresponding common position.

3. The temperature measuring device according to claim 2, wherein the temperature sensor is not installed in some of the plurality of machine tools.

4. The temperature measuring device according to claim 1, wherein
the plurality of machine tools are equivalent models and are installed in equivalent environments, and the temperature sensor to be installed at a position that is hardly affected by heat generation or cooling in the machine tools is installed only in some of the plurality of machine tools, and
each of the plurality of machine tools that does not have a temperature sensor installed at any of the common positions is configured to receive the temperature information of a corresponding position from another of the plurality of machine tools that does have a temperature sensor installed at a corresponding common position.

5. A temperature measuring device configured to acquire, in order to monitor a temperature of each of one or more common positions shared between a plurality of machine tools and set in advance, temperature information measured by a temperature sensor installed at a position of the common positions in at least one machine tool of the plurality of machine tools, and to provide the temperature information acquired as temperature information for that position in another machine tool of the plurality of machine tools that has a temperature sensor determined abnormal installed at that position.

6. The temperature measuring device according to claim 1, the temperature measuring device comprising:
a temperature information acquiring unit configured to acquire the temperature information measured by a temperature sensor installed at a position of the common positions in at least one of the machine tools; and
a temperature information providing unit configured to provide another machine tool in the plurality of machine tools, the another machine tool being not equipped with a temperature sensor at that position, with the temperature information acquired by the temperature information acquiring unit, as temperature information of that position in the another machine tool.

7. The temperature measuring device according to claim 1,
the temperature measuring device being communicatively connected to the plurality of machine tools.

8. A machine tool comprising the temperature measuring device according to claim 1.

9. A temperature measuring method, comprising:
in order to monitor a temperature of each of one or more common positions set in advance, acquiring temperature information measured by a temperature sensor installed at a position of the common positions in at least one of the machine tools, and to provide the temperature information acquired as temperature information for that position in another machine tool of the plurality of machine tools that does not have a temperature sensor installed at that position.

\* \* \* \* \*